United States Patent [19]

Sims

[11] 3,920,957

[45] Nov. 18, 1975

[54] DATE RECORDS AND METHOD AND APPARATUS FOR THEIR READING AND PRODUCTION

[75] Inventor: George Edward Sims, Harpenden, England

[73] Assignee: S.B. Electronic Systems Limited, London, England

[22] Filed: May 11, 1973

[21] Appl. No.: 359,269

[30] Foreign Application Priority Data

May 12, 1972 United Kingdom............... 22270/72
May 26, 1972 United Kingdom............... 24917/72

[52] U.S. Cl....... 235/61.11 R; 178/30; 235/61.11 E; 250/568; 340/146.3 Z

[51] Int. Cl.$^2$...................... G06K 7/10; G06K 19/06; H04L 15/24; G06K 1/22

[58] Field of Search.................. 340/146.3 Z, 172.5; 250/219 D, 566, 568, 569; 235/61.11 E, 61.11 D, 61.12 N, 61.12 M, 61.12 R, 61.11 B; 178/30, 23; 197/1 R; 101/53

[56] References Cited

UNITED STATES PATENTS

| | | | |
|---|---|---|---|
| 1,165,663 | 12/1915 | Goldberg | 178/30 |
| 2,951,121 | 8/1960 | Conrad | 178/23 |
| 3,099,711 | 7/1963 | Foley | 178/30 |
| 3,111,576 | 11/1963 | Lipschutz | 235/61.11 E |
| 3,128,372 | 4/1964 | Braun | 235/61.11 B |
| 3,643,068 | 2/1972 | Mohan | 235/61.11 E |
| 3,699,312 | 10/1972 | Jones | 235/61.11 E |
| 3,701,097 | 10/1972 | Wolff | 340/146.3 Z |
| 3,715,020 | 2/1973 | Nordin | 197/1 R |
| 3,716,699 | 2/1973 | Eckert | 235/61.11 E |
| 3,723,710 | 3/1973 | Crouse | 235/61.11 E |
| 3,759,359 | 9/1973 | Stellmach | 197/1 R |
| 3,783,245 | 1/1974 | Howell | 235/61.11 E |

*Primary Examiner*—Daryl W. Cook
*Assistant Examiner*—Robert M. Kilgore
*Attorney, Agent, or Firm*—Baldwin, Wight & Brown

[57] ABSTRACT

The combination of a record of binary digital data, comprising a recording substrate presenting a plurality of adjacent pairs of adjacent parallel bar-like zones each of which may be of either of two different widths, with a reading head, the zones of each pair being adapted to present two different characteristics identifiable by the reading head so that these characteristics are presented in alternation to a reading head upon relative movement between the reading head and the record in a direction perpendicular to the bar-like zones, the position of every transition between adjacent zones being of independent significance in determining the data recorded.

4 Claims, 4 Drawing Figures

DATE RECORDS AND METHOD AND APPARATUS FOR THEIR READING AND PRODUCTION

This invention relates to data records and methods for their production.

More particularly it is concerned with records in the form of so-called bar codes in which data is stored in coded form on a recording medium utilising a plurality of parallel bar-like zones exhibiting distinguishable characteristics to a reading head passed sequentially across the bars in a direction perpendicular to their length, the length of the bars being large compared with the dimensions of the sensitive area of the reading head.

A number of such codes have become known, finding particular utility where machine readable labels are required in any of a number of industrial and commercial applications, or where printed data is required in densely packed machine readable form. Although such data records have found primary utility in optically readable forms, the present invention is also applicable to data recorded in other forms, as on magnetic tape.

Known bar codes have recorded data in binary form, utilising suitable binary codes for representing alphanumeric data, binary 0 being differentiated from binary 1 by utilising either bars of different thicknesses, or bars having different reflective characteristics (for example bars of different colours). Adjacent bars must be separated by a distance sufficient to enable the reading head used to resolve adjacent bars. This is wasteful of space, particularly in systems where bars of different widths are used, and the code is nevertheless desired to have a constant packing density.

It is an object of the present invention to provide bar coded data records which can achieve a substantially higher packing density whilst maintaining or improving the machine readability of such records.

According to the invention, a record of binary digital data comprises a recording substrate presenting a plurality of adjacent pairs of adjacent parallel bar-like zones each of which may be of either of two different widths, the zones of each pair being adapted to present two different identifiable characteristics so that these characteristics are presented in alternation to a reading head upon relative movement between the reading head and the record in a direction perpendicular to the bar-like zones, the position of every transition between adjacent zones being of independent significance in determining the data recorded.

Considerably greater packing densities are available in a data record according to the invention since no space is wasted in isolating adjacent bits of information.

A further desirable characteristic of a bar code is that it should present not only a high packing density, but also a constant packing density. Although records in accordance with the invention may be used to provide direct representations of binary information with two different widths of bar representing binary 0 and binary 1 respectively, it is preferred, when the data recorded is an even parity code, that the digits of the code are represented according to the following scheme, in which C stands for one of binary 1 and binary 0 and D stands for the other of binary 1 and binary 0, and A and *b* stand for wide or narrow bars of one characteristic, and B and *b* stand for wide and narrow bars of the other characteristic;

A*b* represents the pair of digits DD,

AB represents the triplet of digits DCD,

*a*B represents alternately first the pair of digits DC where this is found immediately preceding a further digit C, and the pair of digits CD where this is found immediately following a preceding digit C, and *ab* represents all digits C not accounted for by other combinations.

Preferably the wide bars are three times the width of the narrow bars, or are provided by forming three immediately adjacent narrow bars, and when this is the case an even packing density will be achieved.

The invention extends to methods of preparing and reading such data records.

The invention is described further with reference to the accompanying drawings in which.

Figure 1:
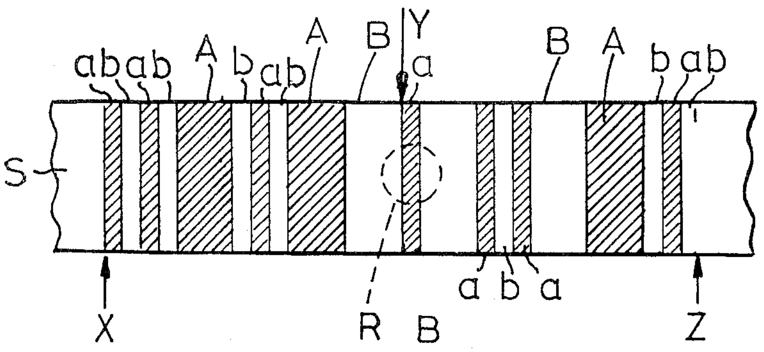
FIG. 1 is a representation of a portion of the data record in accordance with the invention and in tape form.

Referring first to FIG. 1, this shows by way of example part of a data record in strip or tape form bearing two eight bit even parity binary characters 11001010 and 01110001. The commencement of the first of these characters is indicated by the arrow X, its termination and the commencement of the second character by the letter Y, and the termination of the second character by the arrow Z. It will be seen that the tape or strip which forms the substrate S of the record is imprinted with a series of broad or narrow dark zones in the form of bars A or *a* alternating with broad or narrow light zones in the form of bars B and *b*, the bars A and B being the same width of each other and preferably, for various reasons which will become apparent later, of three times the width of the bars *a* and *b*. Whilst dark bars and light bars formed merely by not printing a dark bar have been shown, it should be understood that there may be used any form of bar-like zones of differentiated characteristics, which characteristics or the transitions between which characteristics are recognizable by a reading head to be utilised with the record. These characteristics need not be optical characteristics and the zones could for example be zones of opposite magnetic polarity on a magnetic tape. Hereinafter we will refer where convenient for the purpose of description to bars of contrasting characteristics, it being understood that bars of one type may be formed merely by the absence of bars of the other type.

The record is used in conjunction with a reading head, the outline of which is shown at R, this reading head having a sensitive area of dimensions such that its extent is less than that of the bars. Preferably the reading head has a sensitive area of diameter approximately the same width as a broad bar and three times the width of a narrow bar. This will means that when the head is over a narrow bar, it will also take in portions of two adjacent bars of contrasting characteristics, whereas when directly over a broad bar this will not occur, and the reading head can differentiate between broad and narrow bars regardless of the rate at which the the record and the reading head are moved relative to one another, merely by sensing the level of the output signal from the head. If the reading head is too narrow, it will only be able to differentiate between broad and narrow bars by the period taken to traverse them, and therefore the speed of movement of the reading head relative to the record must be controlled, which is not practicable in a hand held reading head, or some special form of clocking arrangement must be provided. If on the other hand the reading head is too broad, it will be unable to sense transitions between the bars and hence will produce indeterminate outputs.

Unlike known bar codes which utilise broad and narrow dark bars similar to the bars A and *a*, the contrasting bars A and *a*, B and *b* are, in their alternation paired in any of the four combinations *ab*, *a*B, A*b* and AB since the nature of data recorded determines the position of the A or *a* to B or *b* and B or *b* to A or *a* transitions, as opposed to known systems in which one type of bar is used for spacing only and the width of the second type determines the data recorded, or two differentiable types of bars of the same width are used separated by spaces which latter do not provide any additional information.

Data records according to the invention can be produced by the direct recording of binary digits, utilising the broad bars A and B to represent binary 1 and the narrow bars *a* and *b* to represent binary 0, or vice versa. However, such a record has the disadvantage of exhibiting an uneven packing density, even though the mean packing density is substantially higher than that achieved with known bar codes.

In a preferred form of the invention applicable to records of even parity binary codes such as are usually employed in the applications envisaged for the invention, a constant packing density substantially greater than that achieved with the known codes discussed above is achieved by utilising adjacent pairs of contrasting bars to represent binary digits or groups of digits according to a scheme discussed below. For the purpose of convenience, one of the binary digits 0 and 1 is regarded as represented by the letter C and the other by the letter D. In this scheme, the combination A*b* is utilised to represent the pair of digits DD, the combination AB is utilised to represent the triplet of digits DCD, the combination *a*B is utilised alternately first to represent the pair of digits DC where this is found immediately preceeding a further digit C, and then to represent the pair of digits CD when this is found immediately following a preceding digit C, and the combination *ab* is utilised to represent all digits C not represented by the other combinations. With this arrangement, and provided that the broad bars are three times the width of the narrow bars, the packing density achieved when representing an even parity code will always be two thicknesses of a narrow bar per binary digit. Assuming for example that in a particular case the narrowest bar which can conveniently be produced on the records is 0.0125 inches, then 0.025 inches length of the record is required for the recordal of each binary digit as compared with 0.05 inches in known bar codes using broad and narrow bars. The eight bit even parity binary code characters each shown on the record of FIG. 1 have been represented in the fashion discussed above to provide examples.

In reading a record in accordance with the invention, it will be appreciated that it is sufficient for the reading head to be able to identify the transitions between adjacent contrasting bars since the information is carried not by the characteristics of the bars themselves but by their width and the combinations of width of pairs of adjacent bars. It is found possible using a hand moved reading head to recover information reliably from records according to the invention which are less perfectly recorded than is necessary for readability of known bar does by hand moved reading heads; we have found that we can obtain good results even if the data recorded is printed by means of a dot matrix printer.

Figures 2, 3:
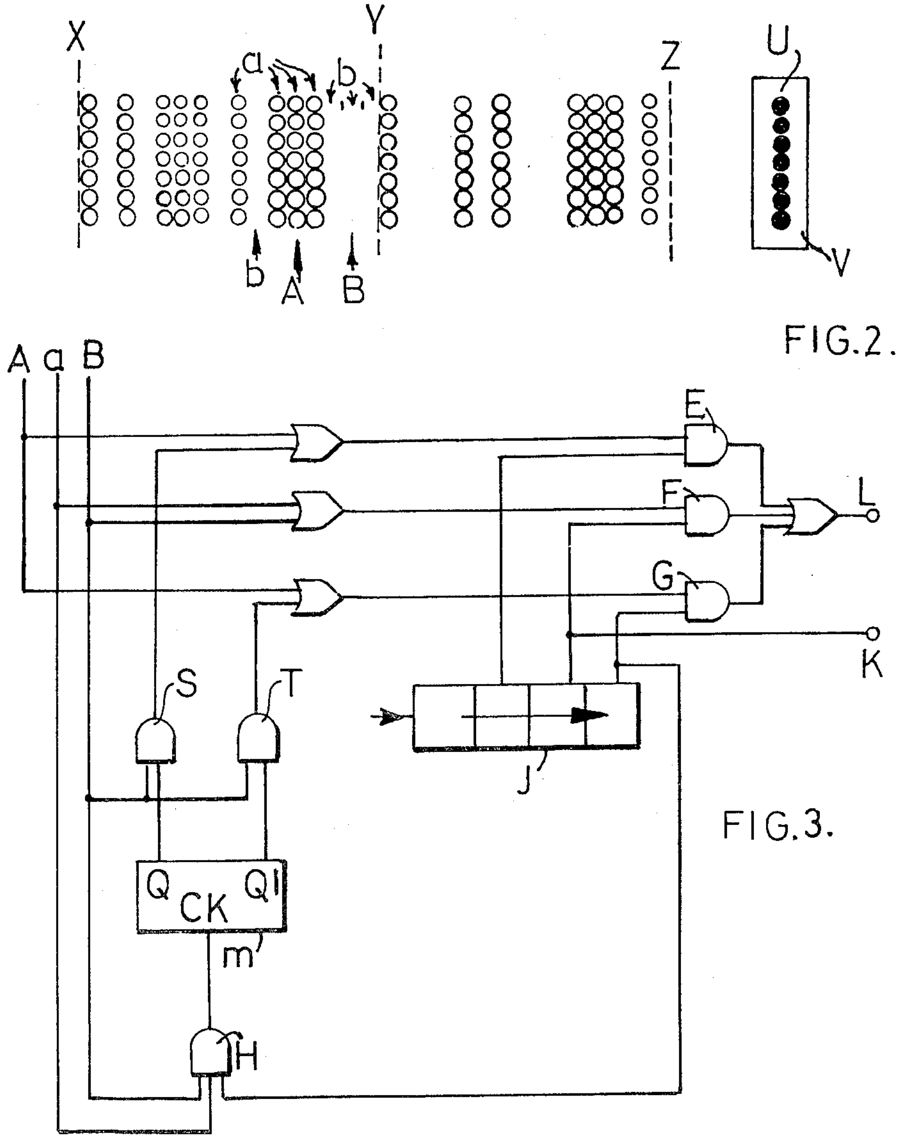
FIG. 2 shows a modification of the record of FIG. 1.
FIG. 3 is a diagram of the logic of a decoder for recovering data from a record in accordance with the invention.

In one such printer normally used for printing out alphanumeric data, the data is printed by successive actuations of a vertically aligned row of individually extensible printer pins U (see FIG. 2) mounted on a carriage V (see FIG. 2) which is stepped across a recording substrate. Acuation of the printer with all seven pins extended will thus print a column of dots which is closely spaced will form a vertical bar, whilst actuation whilst all the pins are retracted will result the absence of a column of dots on the substrate resulting in a bar of contrasting characteristics: broad bars are produced by three consecutive actuations with the pins either extended or retracted. A record produced in such a manner and carrying the same information as the record of FIG. 1 is shown in FIG. 2, and it is found that such a record can be satisfactorily read using known forms of hand held reading head with reliable recovery of the information recorded from the output of the reading head. The reference letters used in FIG. 2 are the same as those utilised in FIG. 1 except that *a* and *b* have also been utilised to indicate that the broad bars A and B are formed by groups of three narrow bars *a* or *b* respectively. A special advantage of this method of printing data records in accordance with the invention is that the same printer may be used to print both alphanumeric and coded information. This is of great advantage where as is often the case as on labels or machine readable directions, it is desired to print alphanumeric and machine readable information consecutively on the same line.

Where binary coded data has been placed on record in the preferred manner described above so as to provide constant packing density, the data recovered by means of the reading head R requires decoding if the original binary coded data is to be restored. One form of decoder suitable for this purpose is shown schematicallly in FIG. 3. According to whether the reading head detects a broad bar A, a narrow bar *a*, a broad bar B or a narrow bar *b*, a logical 1 is applied to corresponding input lines A, B or *a* of the decoder. Where the reading head detects a bar *b* no input is applied to the decoder. The decoder is operated for each pair of adjacent bars AB, A*b*, *a*B or *ab* read by the reading head, appropriate inputs for the bars making up the pair being applied to the decoder simultaneously.

When appropriate inputs have been applied to the decoder, the latter is operated by passing a single logical 1 down the shift register J thus successively enabling AND gates E, F and G whilst causing binary 010 to appear on a data output line L. The writing into further apparatus of data appearing on the line K is controlled by a "write in" line L. When the decoder is operated with the input combination *ab*, the data appearing on output line L is 010, resulting in binary 1 being written into the apparatus receiving the output of the decoder. Where the output combination is A*b*, the data appearing on line L is 101 and the data written in is thus 00. Where the data combination applied to the input is AB, then the data appearing on line L will be 111 and thus the data written in will be 010. It will be noted that the decoder logic includes a flip-flop m which is toggled when the combination of a decoding operation in which the input to the decoder was the combination *a*B enables a gate H connected to its clock input. According to the state of the flip-flop *m*, either the gate S or the gate T is enabled when an *a*B combination is applied to the inputs of the decoder; thus on alternate applications of such an input, gates S and T will be enabled alternately, the flip-flop being set so that a logical 1 appears at its Q output at the commencement of the decoding of a coded character. Thus the first time an *a*B combination is decoded, a 110 output would appear on line L resulting in the writing into subsequent apparatus of the digits 01, whilst on a second appearance of *a*B at the input of the decoder, 011 will appear on line L resulting in the writing in of 10, and these outputs will continue to alternate with subsequent occurrences of this input.

By this means, the original binary coded data stored on the record is recovered.

Figure 4:
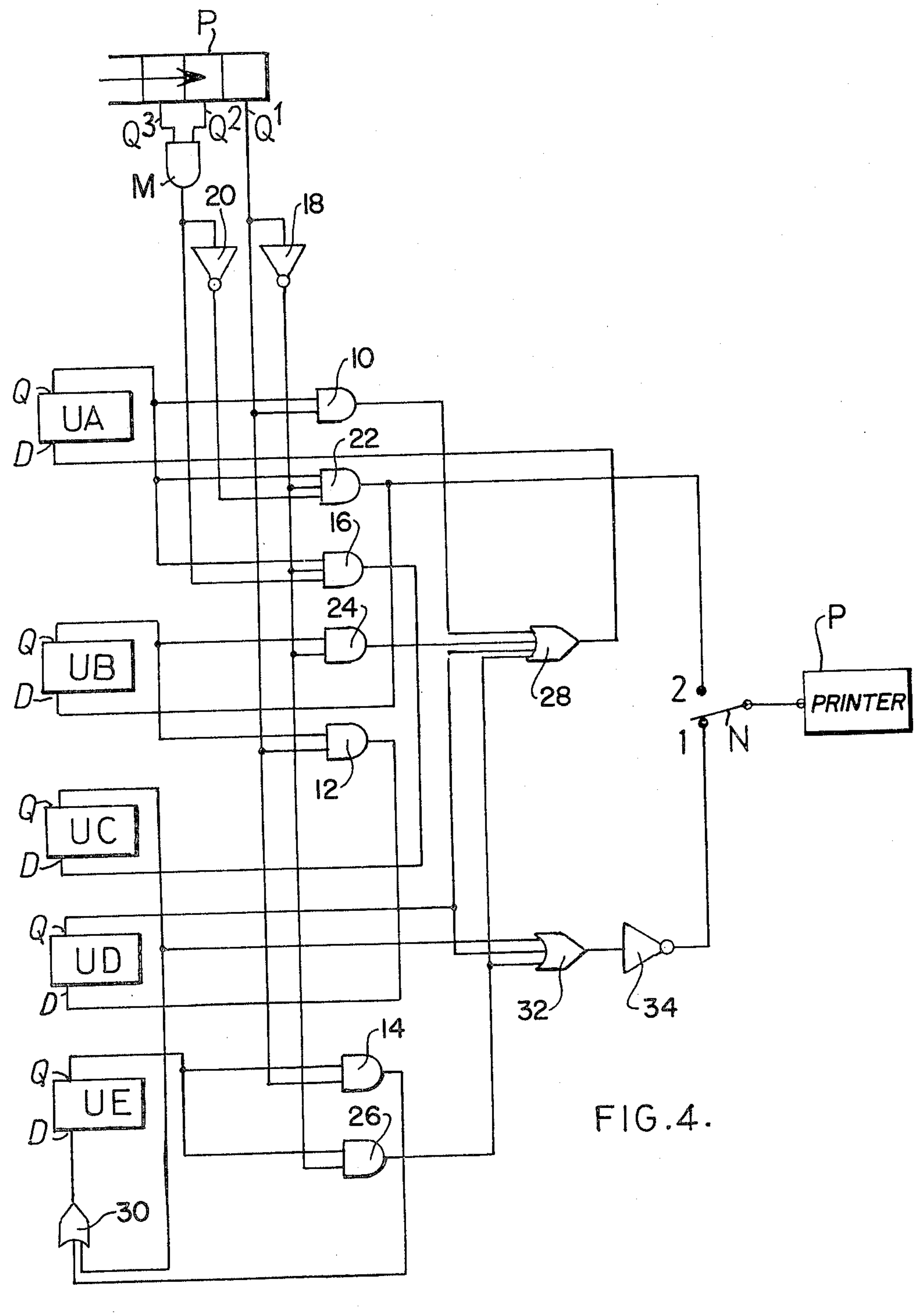
FIG. 4 is a logic diagram of a coder utilised in a preferred form of the invention for placing binary coded data in a condition suitable for incorporation in a record according to the invention.

As described above, a dot matrix printer may be utilised to provide the contrasting bars by which data is recorded on a data record in accordance with the invention, the broader bars being provided by three adjacent narrow bars. Other apparatus for forming bars on a recording substrate can of course be operated upon the same principle. In order that such apparatus may print binary coded information according to the preferred embodiment of the invention giving constant packing density, a coding operation must be included in the imprinting process. A simple form of coder is illustrated in FIG. 4. As previously described, each binary digit in the data to be recorded may be regarded as represented by a pair of adjacent narrow bars, the characteristics of which vary according to the identity of the digit being represented and also in many cases also the identity of the first and second immediately succeeding digits. Thus, the representations of the various basic combinations of binary digits C and D discussed above may be regarded alternatively and represented, instead of in terms of broad bars A, B and narrow bars *a,b* as represented by pairs of narrow bars in a scheme in which DD is represented by *aa ab*, DCD is represented by *aa ab bb*, DC and CD are represented according to the rules previously described by *ab bb*, and C*s* not otherwise accounted for by *ab*.

Referring to FIG. 4, the coder is shown as having two outputs 1 and 2 selected by an output switch N, the switch alternating between positions 1 and 2 on successive operations of the printer P. A logical 1 output from the switch results in the printing of a bar, whilst a logical 0 output results in the absence of a print thus providing a contrasting bar, whilst a complete cycle of operations of the switch results in the provision a pair of adjacent narrow bars. The data to be coded is entered into a shift register P which is clocked after each complete cycle of the switch N so as to enter successive digits of the data into a Q1 position in the register. It will be noted that the state of the two immediately proceeding stages Q2 and Q3 controls the AND gate M which provides a logical 1 output in the event of both the Q2 and Q3 positions being occupied by logical 1. Examination of the logic will show that 5 D-type flip-flops UA, UB, UC, UD and UE are so arranged that only one flip-flop may be set to binary 1 at any one time; the flip-flops are all clocked after a complete cycle of the switch N so as to take up new states in accordance with the new state of the remainder of the logic as determined by Q1, Q2 and Q3. The operations of the coder can be tabulated as follows, the references UA, UB, UC and UE being utilised to identify a flip-flop providing a logical 1 at its Q output.

| State | Q1 | Q2 | Q3 | Output 1 | Output 2 | Set New State |
|---|---|---|---|---|---|---|
| UA | 1 | | | 1 | 0 | UA |
| | 0 | ≠1 | 1 | 1 | 1 | UB |
| | 0 | =1 | 1 | 1 | 0 | UC |
| UB | 0 | | | 1 | 0 | UA |
| | 1 | | | 1 | 0 | UD |
| UD | 0 | | | 0 | 0 | UA |
| UC | 1 | | | 0 | 0 | UE |
| UE | 1 | | | 1 | 0 | UE |
| | 0 | | | 0 | 0 | UA |

Operation in accordance with this table will give the desired coded outputs at the switch N.

As will be seen from FIG. 4, the encoder includes, in addition to the shift register P, the gate M and the flip-flops UA-UE, the AND gates 10, 12 and 14 connected to the Q1 output of the shift register P; the gate 16 connected to the output of the gate M; the inverters 18 and 20 respectively connecting the Q1 output to the gates 22, 16, 24 and 26 and the output of the gate M to the gate 22; the OR gate 28 having inputs from the gates 10, 24 and 26 and from the flip-flop UD; and the OR gate 30 having inputs from the gate 14 and from the flip-flop UC. The logic means which connects the encoder to the printer P comprises the OR gate 32 with inverter 34 and the switch N which, in the 2 position connects the output of the inverter 34 to the printer P and in the 2 positions connects the output of the gate 22 to the printer. When the printer is actuated while receiving a "one" input it will print a narrow line corresponding to *a* and when the printer is actuated while receiving a "zero" input it will not print, thus leaving a narrow blank space corresponding to *b*.

I claim:

1. A scanner for detecting a binary code formed of alternate code regions of contrasting kinds and of one of two widths, the code regions of one kind and of respectively narrow and wide widths being represented by *a* and A, and the code regions of the other kind and of respectively narrow and wide widths being represented by *b* and B, comprising in combination:

read head means for determining the kind and width of successive pairs of code regions; and logic means connected to said read head means for producing one of the binary bits "one" and "zero" in response to the sequence *ab* in each said pairs of code regions, a pair of one of said binary bits in response to the sequence A*b*, a triplet of alternate ones of said binary bits in response to the sequence AB, and successively a disparate pair of said binary bits and the complement thereof in response to successive sequences of *a*B;

said logic means comprising first gate means having separate inputs respectively indicative of conditions A, a, and B, second gate means connected to said first gate means, shift register means for successively enabling said second gate means; and a binary circuit for alternately enabling different ones of said first gate means in response to successive sequences of *a*B.

2. A scanner as defined in claim 1, wherein the width of A is equal to that of B and is three times the width of *a* and of *b*.

3. A bar code writing system for marking entities in accord with a bar code, comprising in combination:

encoder means for converting a binary number to a code format in which one of the binary bits "zero" and "one" is represented by the sequence *ab*, a pair of one of said binary bits is represented by the sequence A*b*, a triplet of alternate ones of said binary bits is represented by the sequence AB, and successive disparate pairs of said binary bits and the complement thereof are represented by the sequence *a*B;

writing means for marking a substrate in bar code; and logic means connecting said encoder means to said writing means for controlling said writing means to mark said substraate with successive pairs of unlike code regions corresponding to said sequences in which the widths of the code regions corresponding to *a* and *b* are narrow and those widths corresponding to A and to B are wide said encoder means comprising a shift register having parallel outputs, a plurality of flip-flops, and a plurality of gates interconnecting the outputs of said shift register to set said flip-flops; said logic means comprising further gate means connected to the output of one of said flip-flops and to the outputs of certain of said plurality of gates, and a switch having one position connecting said writing means to the output of said further gate means and a second position connecting said writing means to the output of one of said plurality of gates.

4. A bar code writing system as defined in claim 3 wherein the widths A and B are equal and respectively are equal to 3*a* and 3*b*.

* * * * *